(12) United States Patent
Williams

(10) Patent No.: US 9,657,768 B2
(45) Date of Patent: May 23, 2017

(54) ENGINE CRANKSHAFT

(71) Applicant: Ford Global Technologies, LLC, Dearborn, MI (US)

(72) Inventor: Rickey L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 14/532,933

(22) Filed: Nov. 4, 2014

(65) Prior Publication Data
US 2016/0123379 A1 May 5, 2016

(51) Int. Cl.
| | | |
|---|---|---|
| F02B 75/24 | (2006.01) | |
| F02B 75/32 | (2006.01) | |
| F02B 75/20 | (2006.01) | |
| F02B 75/22 | (2006.01) | |
| F16C 3/20 | (2006.01) | |
| F16F 15/28 | (2006.01) | |
| F02B 75/06 | (2006.01) | |
| F16C 3/08 | (2006.01) | |
| F16C 9/02 | (2006.01) | |
| F02B 75/18 | (2006.01) | |
| F16C 19/54 | (2006.01) | |

(52) U.S. Cl.
CPC ............... *F16C 3/20* (2013.01); *F02B 75/06* (2013.01); *F16C 3/08* (2013.01); *F16C 9/02* (2013.01); *F16F 15/283* (2013.01); *F02B 2075/1812* (2013.01); *F16C 19/54* (2013.01)

(58) Field of Classification Search
CPC ..... B21D 3/16; F16C 3/10; F16C 3/20; F16C 3/08; F16C 9/02; F16C 19/54; F02F 7/0053; F02F 7/0007; F02B 2075/025; F02B 75/06; F02B 2075/1812; F16F 15/283
USPC ........... 123/195 R, 51 AA, 197.4, 53.1, 58.1
See application file for complete search history.

(56) References Cited

U.S. PATENT DOCUMENTS

| | | | |
|---|---|---|---|
| 5,076,220 A * | 12/1991 | Evans | F02B 41/00 123/197.4 |
| 9,004,022 B2 * | 4/2015 | Williams | F16C 3/10 123/197.4 |
| 2011/0174260 A1 * | 7/2011 | Hayman | F02M 35/116 123/193.5 |
| 2013/0167793 A1 * | 7/2013 | Roehrig | F16F 15/26 123/192.2 |
| 2014/0041618 A1 | 2/2014 | Williams | |
| 2014/0130561 A1 | 5/2014 | Nolten et al. | |

* cited by examiner

*Primary Examiner* — Carlos A Rivera
*Assistant Examiner* — Syed O Hasan
(74) *Attorney, Agent, or Firm* — Greg Brown; McCoy Russell LLP

(57) ABSTRACT

A crankshaft in an engine is provided. The crankshaft includes only two outer bearing journals configured to attach to two outer crankshaft bearings, only a single inner bearing journal positioned axially between the two outer bearing journals configured to attach to an inner crankshaft bearing, an unsupported section positioned axially between the inner bearing journal and one of the outer bearing journals, and only three rod journals each configured to attach to a separate piston rod.

19 Claims, 4 Drawing Sheets

US 9,657,768 B2

ENGINE CRANKSHAFT

FIELD

The present disclosure relates to a crankshaft in an engine.

BACKGROUND AND SUMMARY

Crankshafts are used in engines to transfer rotational energy to a vehicle transmission to provide motive power to the wheels. Bearings are provided in the engine to support the crankshaft and guide rotation of the crankshaft. Specifically, bearing journals coupled to bearings are typically provided between each rod journal in the crankshaft. However, the bearings supporting the crankshaft generate friction during rotation, thereby decreasing crankshaft efficiency. Consequently, engine efficiency and therefore engine fuel economy are decreased.

US 2014/0041618 discloses a crankshaft design for a four cylinder engine with reduced journal bearings. The inventors have recognized several drawbacks with the crankshaft design disclosed in US 2014/0130561 when applying the approach to an engine with fewer cylinders. For example, removing crankshaft bearings in an engine having 3 cylinders may increase bending of the crankshaft beyond a desirable level, thereby increasing engine vibration. Furthermore, engines with an odd number of cylinders, such as a 3 cylinder engines, typically have an even number of bearings and corresponding bearing journals. Therefore, removing a single bearing and bearing journal in the crankshaft makes the bearing arrangement non-symmetric with regard to a longitudinal direction. Non-symmetric distribution of the bearings and corresponding bearing journals unduly increases bending in the unsupported section which again leads to increased engine vibration and decreased crankshaft and bearing longevity.

As such in one approach, a crankshaft in an engine is provided. The crankshaft includes A crankshaft in an engine is provided. The crankshaft includes only two outer bearing journals configured to attach to two outer crankshaft bearings, only a single inner bearing journal positioned axially between the two outer bearing journals configured to attach to an inner crankshaft bearing, an unsupported section positioned axially between the inner bearing journal and one of the outer bearing journals, and only three rod journals each configured to attach to a separate piston rod. Providing a crankshaft with only three bearing journals and three rod journals enables the crankshaft friction to be reduced when compared to previous crankshafts for three cylinder engines that include four bearing journals and corresponding crankshaft bearings. As a result, fuel economy is improved. Additionally, using only three bearing journals enables the cost of the engine to be reduced, due to the elimination of a crankshaft bearing and corresponding parts. Furthermore, the mass of the engine can be reduced when a crankshaft bearing and corresponding parts are eliminated in the engine.

In one example, the unsupported section and the inner bearing journal are offset from a longitudinal centerline of the crankshaft. In this way, spacing of the cylinders in the engine can be maintained at desired distances when a bearing journal in the crankshaft is removed.

In one example, the unsupported section has a larger diameter than the bearing journals. As a result, crankshaft bending, torsion, and fatigue are reduced to provide desired crankshaft rotational characteristics. Specifically, the increased diameter of the unsupported section increases crankshaft stiffness in a desired area that may be particularly susceptible to bending.

Further in one example, two of the three rod journals are positioned axially between one of the outer bearing journals and the single inner bearing journal and one of the rod journals is positioned axially between the single inner bearing journal and the other outer bearing journal. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

A crankshaft having only three bearing journals and three journal pins is described herein. An inner bearing journal positioned between two of the bearing journals may be offset from a longitudinal centerline of the crankshaft and the crankshaft may further include an unsupported section positioned between the inner bearing journal and an outer bearing journal. The unsupported section essentially enables a bearing to be removed from the engine assembly. In one example, the diameter of the unsupported section may be greater than the diameters of the bearing journals. The larger diameter of the unsupported section enables an increase structural integrity of the section to decrease crankshaft bending during rotation. Specifically, the larger diameter of the unsupported section enables the crankshaft to achieve desired crankshaft bending, torsion, and fatigue characteristics. Thus, increasing the diameter of the unsupported section decreases crankshaft bending, torsion, and fatigue. It will be appreciated that, when a crankshaft having the aforementioned characteristics is utilized, friction in the crankshaft assembly is reduced thereby increasing engine efficiency and fuel economy. Furthermore, when a crankshaft having the aforementioned characteristics is utilized in an engine, the number of components in the engine can be reduced, if desired, thereby reducing manufacturing costs of the engine.

Figure 1:
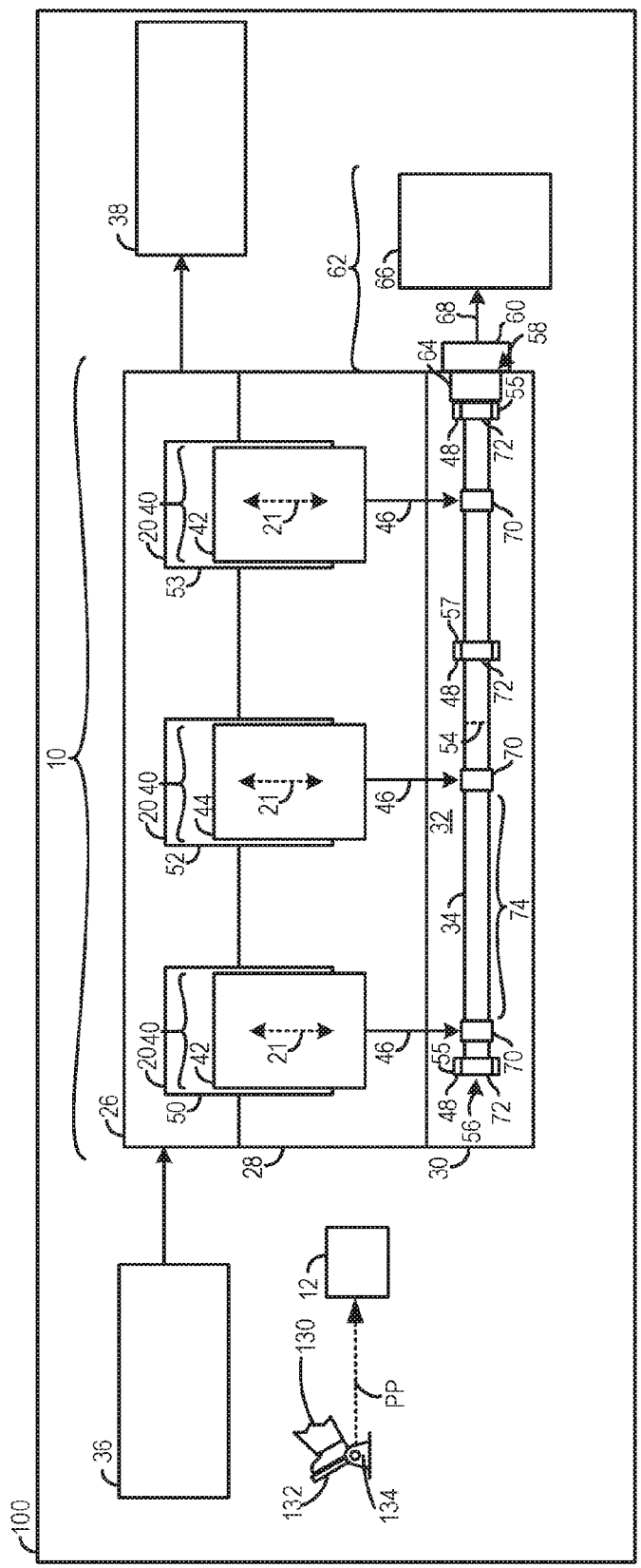
FIG. 1 shows a schematic depiction of an engine including a crankshaft.

Referring now to FIG. 1 showing an example engine 10 included in a vehicle 100. Thus, the engine 10 can provide a propulsion system for an automobile, in one example. Engine 10 may be controlled at least partially by a control system including engine controller 12 and by input from a vehicle operator 130 via an input device 132. In this example, input device 132 includes an accelerator pedal and a pedal position sensor 134 for generating a proportional pedal position signal PP. It will be appreciated that the engine controller 12 may include instructions stored in memory executable by a processor.

The engine 10 may include a plurality of cylinders 20. The engine 10 may be configured to implement combustion operation, such as a four stroke combustion cycle, in the cylinders 20. Specifically, in the depicted example, the engine includes three cylinders. The cylinders 20 are arranged in an inline configuration. That is to say that a plane extends through the central axes 21 of each of the cylinders. A cylinder head 26 is coupled to a cylinder block 28 to form the cylinders 20. An oil reservoir 30 (e.g., oil pan) may be coupled to the cylinder block 28. Portions of the cylinder block 28 and the oil reservoir 30 form boundaries of a crankcase 32 enclosing a crankshaft 34. The cylinders 20 include a first cylinder 50, a second cylinder 52, and a third cylinder 53 sequentially arranged. Therefore there are two outer cylinders (50 and 53) and an inner cylinder 52. The firing order of the cylinder may be the first cylinder 50, the second cylinder 52, and the third cylinder 52.

An intake system 36 provides intake air to the cylinders 20. Likewise, an exhaust system 38 receives exhaust gas from the cylinders 20. The intake system 36 may include various components (not shown) for delivering intake air at desired rates to the cylinders such as a filter, throttle, intake conduits, intake manifold, intake valves coupled to the cylinders, etc. Additionally, the exhaust system 38 includes various components (not shown) for receiving exhaust gas from the engine, such as an exhaust manifold, exhaust valves coupled to the cylinders, exhaust conduits, emissions control devices (e.g., filter catalysts), etc.

Each of the cylinders 20 includes a piston 40 disposed therein. There are two outer pistons 42 and an inner piston 44. The pistons 40 are coupled to the crankshaft 34 via piston rods denoted via arrows 46. Crankshaft bearings 48 are rotationally coupled to the crankshaft 34 to support the crankshaft and guide rotation of the crankshaft 34. It will be appreciated that the crankshaft bearing 48 may include various components for achieving the aforementioned functionality, such as inner races, outer races, roller elements, etc. Specifically, there is an inner crankshaft bearing 57 axially positioned between two outer crankshaft bearings 55. As shown, the inner crankshaft bearing 57 may be offset from a centerline 54 of the crankshaft 34 in an axial direction. It will be appreciated that the centerline 54 is the midpoint between a first end 56 of the crankshaft 34 and a second end 58 of the crankshaft. The crankshaft bearings 48 may be coupled to components in the crankcase 32.

The first end 56 of the crankshaft 34 may be coupled to a component in the engine adjacent to a front engine cover. Additionally, the second end 58 of the crankshaft 34 may be coupled to a flywheel 60 in a transmission 62 of the engine 10. The transmission 62 includes gears 66 coupled to the flywheel 60, denoted via arrow 68. Specifically, the crankshaft 34 may include a flywheel attachment interface 64 for attaching the crankshaft to the flywheel.

The crankshaft 34 further includes rod journals 70 coupled to the piston rods 46. Additionally, the crankshaft 34 includes bearing journals 72. The bearing journals 72 are configured to attach to the crankshaft bearings 48. Specifically, there are two outer bearing journals and an inner bearing journal included in the crankshaft. The bearing journals are discussed in greater detail herein with regard to FIG. 2. The crankshaft further includes an unsupported section 74 positioned between two of the rod journals 70.

The unsupported section 74 does not have a crankshaft bearing coupled thereto and therefore is not directly supported by external components. The unsupported section is also discussed in greater detail herein with regard to FIG. 2.

It will be appreciated that the crankshaft 34 and other components in the engine 10 are schematically depicted in FIG. 1 to aid in the comprehension of the engine layout. However, the crankshaft 34 and other components have greater geometric complexity and additional components such as bearing journals, rod journals, counterweights, etc., that are described in greater detail herein.

Figure 2:
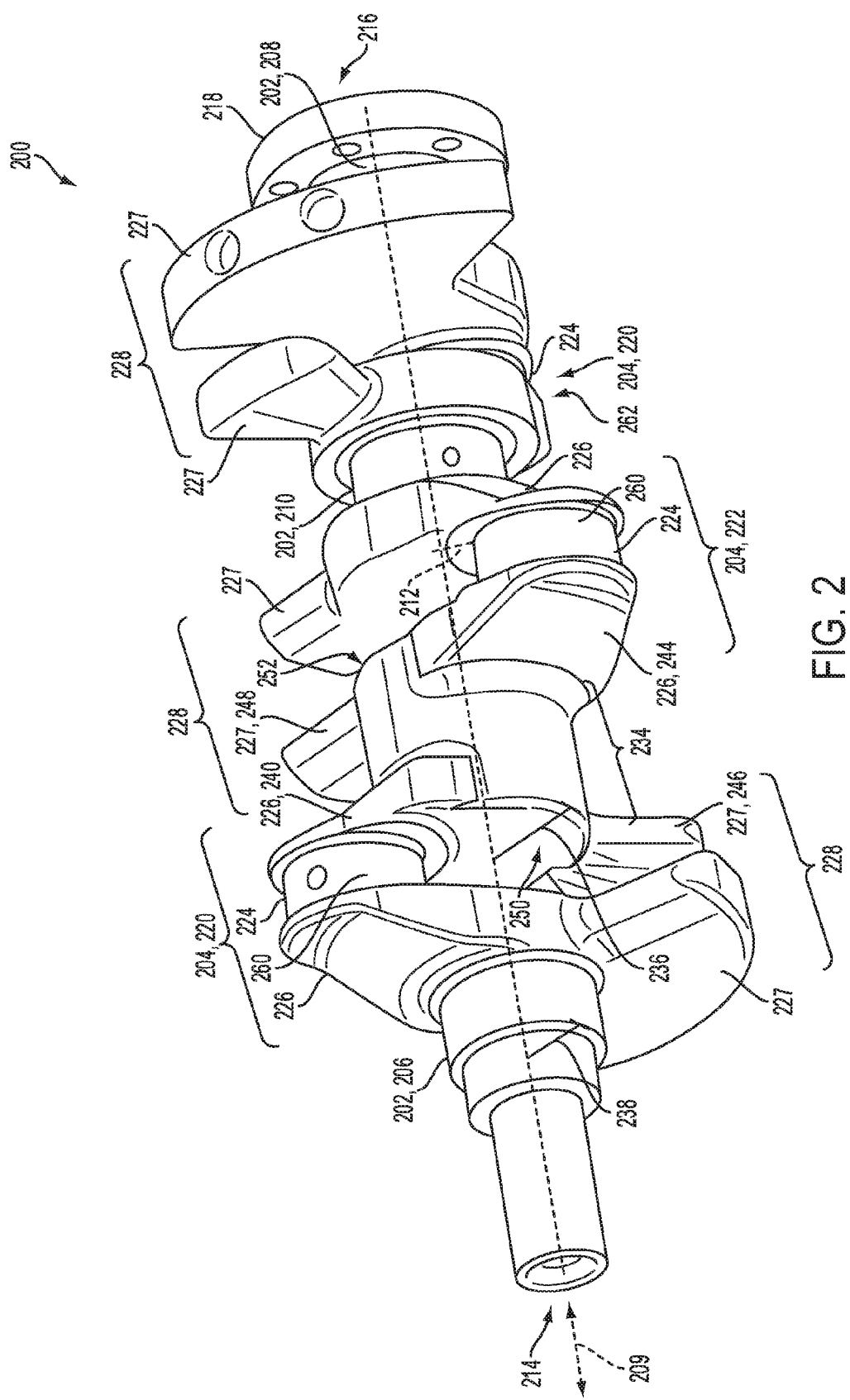
FIG. 2 shows an illustration of an example crankshaft.

FIG. 2 shows a perspective view of an example crankshaft 200. The crankshaft 200 may be an example of the crankshaft 34 shown in FIG. 1 and therefore may be included in the engine 10 shown in FIG. 1. As illustrated in FIG. 2, the crankshaft 200 includes three bearing journals 202 and three crank pins 204. Specifically, a first outer bearing journal 206, a second outer bearing journal 208, and an inner bearing journal 210 are included in the crankshaft 200. The inner bearing journal 210 is positioned axially between the outer bearing journals (206 and 208). The rotational axis 209 of the crankshaft is provided for reference. The inner bearing journal 210 is offset from a centerline 212 of the crankshaft 200 in an axial direction. The centerline 212 is the midpoint between a first end 214 of the crankshaft and a second end 216 of the crankshaft. As previously discussed, the first end 214 may be coupled to a portion of the engine adjacent to the front engine cover (not shown) and the second end 216 of the crankshaft 200 includes a flywheel attachment interface 218 configured to attach to a flywheel, such as the flywheel 60 shown in FIG. 1. Thus, an end of the crankshaft is positioned adjacent to a flywheel. The flywheel attachment interface may include openings configured to receive attachment devices, such as bolts for coupling the crankshaft to the flywheel.

There are two outer rod journals 220 and an inner rod journal 222 positioned axially between the two outer rod journals. Thus, there are three rod journals. In the depicted example, the crankshaft 200 only includes 3 rod journals. Each of the rod journals (220 and 222) may be coupled (e.g., directly coupled) to a piston rod, such as the piston rods 46, shown in FIG. 1. In turn, the piston rods are coupled to pistons disposed in cylinders. It will be appreciated that during rotation of the crankshaft the rod journals (220 and 222) guide the rotation of the pistons rods to move the pistons in a reciprocating motion in the cylinders.

The rod journals (220 and 222) each include a rod connection section 224. The rod connection sections 224 are cylindrical, in the depicted example. Additionally, the rod journals each include a pair of arms 226 coupled to opposing sides of the rod connection sections 224.

The crankshaft 200 further includes counterweights 227 extending away from the rod journals (220 and 222). The counterweights 227 are symmetric about at least one axis. The counterweights 227 provide a counterbalance for the rod journals. The rod connection sections 224 may each be positioned between a pair 228 of the counterweights 227.

The crankshaft 200 further includes two outer bearing journals (206 and 208). In one example, the crankshaft 200 may include only two outer bearing journals. The inner bearing journal 210 is positioned axially between the two outer bearing journals (206 and 208). In one example, the crankshaft may only include a single inner bearing journal. Each of the bearing journals (206, 208, and 210) is configured to attach to a crankshaft bearing, such as one of the crankshaft bearings 48, shown in FIG. 1. As shown, one of the outer bearing journals is positioned adjacent to the flywheel attachment interface 218. In the depicted example, the inner bearing journal 210 is offset from the centerline 212 of the crankshaft in an axial direction. It will be appreciated that the centerline 212 is the axial midpoint of the crankshaft 200 between the first end 214 and the second end 216. Additionally, both the two outer bearing journals (206 and 208) and the inner bearing journal 210 are aligned with the axis of rotation 209 of the crankshaft 200.

The crankshaft 200 further includes an unsupported section 234 positioned axially between the inner bearing journal 210 and the outer bearing journals 206. It will be appreciated that the unsupported section 234 is not directly coupled to any supporting structure such as a crankshaft bearing. Thus, the unsupported section 234 extends through the crankcase without any components coupled thereto. The unsupported section 234 is also axially aligned. That is to say that the unsupported section 234 is aligned with the axis of rotation 209 of the crankshaft 200. Additionally, the unsupported section 234 is cylindrical, in the depicted example. More generally, the unsupported section may be symmetric about an axial cross-section. It will be appreciated that the cross section is perpendicular to the rotational axis 209 of the crankshaft 200. However, other geometries and/or positions of the unsupported section have been contemplated. Furthermore, the unsupported section 234 has a larger diameter 236 than the diameters 238 of the bearing journals (206 and 208). It will be appreciated that the bearing journals (206 and 208) may be substantially identical in size and geometry. In this way, the structural integrity of the crankshaft can be increased. Additionally, the unsupported section 234 is offset from the centerline 212 of the crankshaft 200 in an axial direction. The unsupported section 234 is positioned between an arm 240 of one of the outer rod journals 220 and an arm 244 of the inner rod journal 222. The arms 240 and 244 extend radially away from the axis of rotation 209.

The crankshaft 200 includes a counterweight 246 coupled to one of the outer rod journals 220 and another counterweight 248 coupled to the inner rod journal 222. The unsupported section 234 is positioned axially (e.g., longitudinally) between the counterweight 246 and the counterweight 248. The unsupported section 234 is therefore coupled to the counterweight 246 on a first side 250 and coupled to the counterweight 248 on a second side 252. Additionally, the crankshaft 200 may comprise a metal, such as an alloy, and may be constructed via casting, forging, milling, etc., which forms a continuous shape. In one example, the unsupported section 234 may cast or forged.

Additionally, two of the three rod journals 260 are positioned axially between one of the outer bearing journals 206 and the single inner bearing journal 210 and one of the rod journals 262 is positioned axially between the single inner bearing journal 210 and the other outer bearing journal 208. In one example, the axial width of the arms 226 coupled to the rod connection sections 224 adjacent to the unsupported section 234 may be increased to increase crankshaft stiffness. Therefore, the axial width of the arms adjacent to the unsupported section may be greater than the axial width of the arms spaced away from the unsupported section, in one example.

Figure 3:
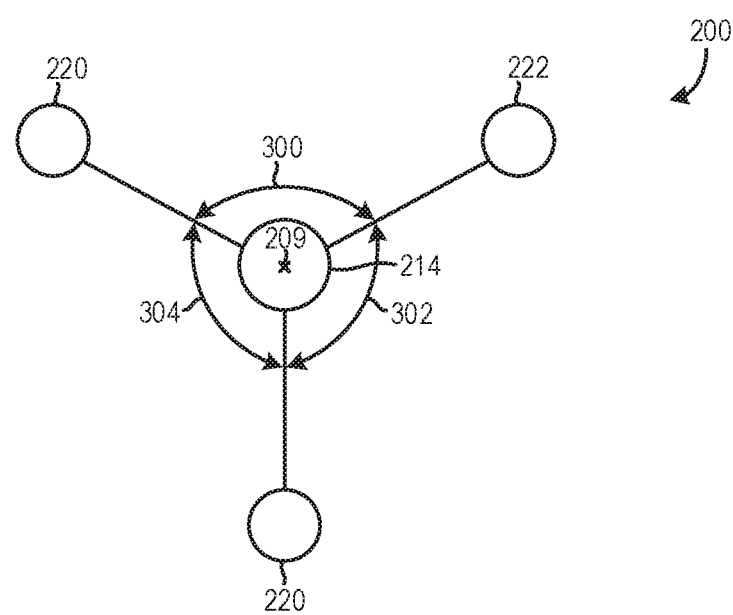
FIG. 3 shows another illustration of the crankshaft shown in FIG. 2 depicting the angular separation between the rod journals in the crankshaft.

FIG. 3 shows a depiction of the angular separation of the rod journals (220 and 222) in the crankshaft 200. FIG. 3 shows the crankshaft 200 from the first end 214. The components shown in FIG. 3 are depicted via straight lines and circular masses to assist in comprehension of the relative position of the rod journals. However, as shown in FIG. 2 the crankshaft 200 has additional geometric complexity.

Continuing with FIG. 3, the angular separation between one of the outer rod journals 220 and the inner rod journal 222 is shown at 300 and the angular separation between the other outer rod journal 220 and the inner rod journal 222 is shown at 302. Furthermore, the angular separation between the outer rod journals 220 is shown at 304. In the depicted example, each of the angular separations (300, 302, and 304) is 120 degrees.

It will be appreciated that each of the rod journals (220 and 222) has a different angular position with regard to the rotational axis 209 of the crankshaft 200. Correspondingly, each of the counterweights 228, shown in FIG. 2, extend away from their corresponding rod journal at different angular positions with regard to the rotational axis 209.

Figure 4:
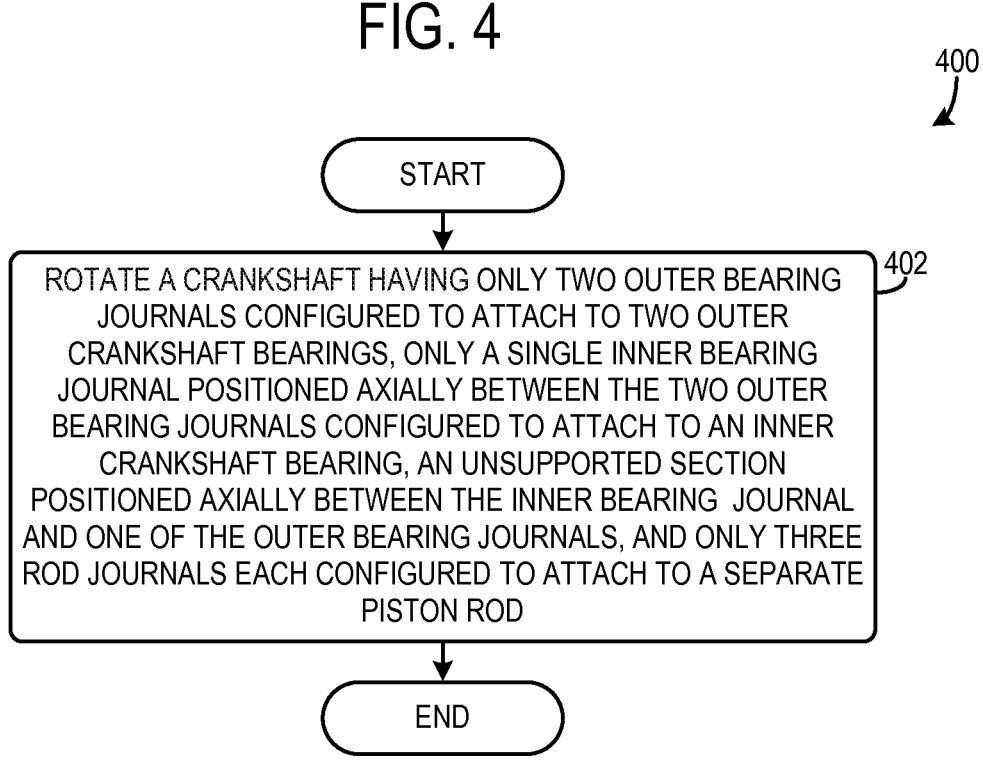
FIG. 4 shows a method for operation of a crankshaft.

FIG. 4 shows a method 400 for operation of a crankshaft/transmission. The method 400 may be implemented via the crankshaft/transmission discussed above with regard to FIGS. 1-3 or may be implemented via another suitable crankshaft/transmission.

At 402 the method includes rotating a crankshaft having only two outer bearing journals configured to attach to two outer crankshaft bearings, only a single inner bearing journal positioned axially between the two outer bearing journals configured to attach to an inner crankshaft bearing, an unsupported section positioned axially between the inner bearing journal and one of the outer bearing journals, and only three rod journals each configured to attach to a separate piston rod.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first"

element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A crankshaft in an engine comprising:
only two outer bearing journals configured to attach to two outer crankshaft bearings;
only a single inner bearing journal positioned axially between the two outer bearing journals configured to attach to an inner crankshaft bearing;
an unsupported section positioned axially between the inner bearing journal and one of the outer bearing journals; and
only three rod journals each configured to attach to a separate piston rod, the engine including a first cylinder, a second cylinder, and a third cylinder sequentially arranged in an inline configuration having a corresponding piston disposed therein and coupled to one of the piston rods.

2. The crankshaft of claim 1, where the inner bearing journal is offset from an axial centerline of the crankshaft.

3. The crankshaft of claim 1, where the unsupported section has a larger diameter than diameters of the bearing journals.

4. The crankshaft of claim 3, where the unsupported section is positioned between a section of a first counterweight coupled to a first outer rod journal and a section of a second counterweight coupled to a second outer rod journal.

5. The crankshaft of claim 4, where the first and second counterweights extend away from their respective rod journal.

6. The crankshaft of claim 1, where an end of the crankshaft is coupled to a flywheel adjacent to one of the two outer bearing journals.

7. The crankshaft of claim 1, where each of the rod journals are separated by 120 degrees.

8. An engine comprising:
a crankshaft including only three rod journals coupled to three piston rods and including at least two outer bearing journals each coupled to an outer crankshaft bearing and a single inner bearing journal offset from an axial centerline of the crankshaft and coupled to an inner crankshaft bearing;
an unsupported section positioned axially between the inner bearing journal and one of the outer bearing journals; and
a first cylinder, a second cylinder, and a third cylinder sequentially arranged in an inline configuration having a corresponding piston disposed therein and coupled to one of the piston rods.

9. The engine of claim 8, where combustion is sequentially initiated in the first cylinder, the second cylinder, and the third cylinder.

10. The engine of claim 8, where the unsupported section has a greater diameter than diameters of the bearing journals.

11. The engine of claim 10, where the unsupported section is aligned with a rotational axis of the crankshaft.

12. The engine of claim 10, where the unsupported section is symmetric in an axial cross-section.

13. The engine of claim 8, where two of the three rod journals are positioned axially between one of the outer bearing journals and the single inner bearing journal and one of the rod journals is positioned axially between the single inner bearing journal and the other outer bearing journal.

14. The engine of claim 8, where there are only three bearings in the engine coupled to corresponding bearing journals in the crankshaft, the crankshaft including only three bearing journals.

15. A crankshaft in an engine comprising:
two outer bearing journals configured to attach to two outer crankshaft bearings;
a single inner bearing journal configured to attach to an inner crankshaft bearing;
two outer rod journals and an inner rod journal, each of the rod journals configured to attach to a separate piston rod; and
an axially aligned unsupported section positioned axially between one of the outer rod journals and the inner rod journal and having a greater diameter than the inner and outer bearing journals, the engine including a first cylinder, a second cylinder, and a third cylinder sequentially arranged in an inline configuration having a corresponding piston disposed therein and coupled to one of the piston rods.

16. The crankshaft of claim 15, where the single inner bearing journal is offset from a centerline of the crankshaft.

17. The crankshaft of claim 15, where the unsupported section is coupled to a first counterweight on a first side and a second counterweight on a second side.

18. The crankshaft of claim 15, where the unsupported section is cylindrical.

19. The crankshaft of claim 15, where each of the rod journals are separated by 120 degrees.

* * * * *